United States Patent [19]

Bruhn

[11] Patent Number: 4,573,503

[45] Date of Patent: Mar. 4, 1986

[54] INK DROPPER CLOSURE

[75] Inventor: Bernhard Bruhn, Halstenbek, Fed. Rep. of Germany

[73] Assignee: Koh-I-Noor Rapidograph, Inc., Bloomsbury, N.J.

[21] Appl. No.: 655,604

[22] Filed: Sep. 28, 1984

[30] Foreign Application Priority Data

Oct. 10, 1983 [DE] Fed. Rep. of Germany ... 8329184[U]

[51] Int. Cl.<sup>4</sup> ............................................. B65B 3/12
[52] U.S. Cl. ..................................... 141/24; 222/209
[58] Field of Search ...................................... 141/1–12, 141/18–29; 222/206–215

[56] References Cited

U.S. PATENT DOCUMENTS

| 463,215 | 11/1891 | Rodiger | 141/24 |
| 2,156,112 | 4/1939 | Dykema | 221/148 |
| 3,158,183 | 11/1964 | Brown | 141/24 |
| 3,312,255 | 4/1967 | Miller | 141/24 |
| 3,820,576 | 6/1974 | Torrent | 141/24 |
| 4,286,633 | 9/1981 | Herr | 141/24 |

FOREIGN PATENT DOCUMENTS 60436 1/1913 Austria ............................... 141/24
2901827 12/1980 Fed. Rep. of Germany .

Primary Examiner—Houston S. Bell, Jr.
Attorney, Agent, or Firm—David H. Semmes; Warren E. Olsen

[57] ABSTRACT

An improved bottle closure having a dropper, wherein the rubber suction element of the dropper has a posterior end, extending through the closure element, and an anterior end defined by a conventional suction tube. An annular bearing element of the suction element is adapted to seal against the top of the container, so that as the closure element is tightened onto the container, a section of the suction element is axially shortened between the bearing element and a point of connection with the closure element. Hence, as the closure element is removed, a predetermined amount of fluid will aspirate into the anterior end of the suction tube of the dropper.

7 Claims, 2 Drawing Figures

INK DROPPER CLOSURE

BACKGROUND OF THE INVENTION

1. Field of the Invention

The invention relates to a bottle closure element having a dropper, in which the suction element of the dropper, which is of elastically deformable material, remains accessible from the outside in its posterior region. The suction element connects to a suction tube at its anterior end, and has an annular sealing element means, (anterior to the region where the suction element is connected to the closure element,) so as to rest sealingly on the upper rim of the ink container. The suction element also has a section, the length of which is variable in the axial direction.

2. Brief Description of the Prior Art

In a known device (German laid-open patent application DE-OS No. 29 01 827), the suction element of the dropper is secured in the bottom wall of a screw-type sealing element, so that the annular bearing surface of the suction element rests on the inside surface of the bottom wall. When the closure element is screwed onto the container, this bearing surface is pressed by this bottom surface against the upper rim of the container opening, thereby effecting a seal. In order to be able, in this known container, to bring the lower end of the suction tube into the area of the container bottom (even when the closure element is not firmly seated upon the container,) the suction tube is secured on a bellows-like section formed preceding the annular bearing surface of the suction element. Hence, if the closure element is screwed onto the container, the lower end of the suction tube comes to rest on the container bottom, and the bellows-like section is shifted laterally and/or compressed in a substantially unreplicable manner. Likewise, when the closure element is loosened the dropper can be introduced so far into the container, that the lower end of the suction tube will reach the region of the container bottom, without any shortening of the bellows-like section being effected thereby.

OBJECT AND SUMMARY OF THE INVENTION

It is the object of the invention to devise a container having a releasable closure element, including a dropper, so that as the closure element is removed from the container, the dropper automatically is filled with a substantially pre-determined quantity of fluid, drawn from the container.

In order to attain this object, a container of the general type described hereinbefore is embodied in accordance with the invention, with a suction element having a variable length section that is provided between a bearing surface and a point of connection between the closure element and the suction element. This section has an axial length that is shorter when the closure element is closing the container, than when the closure element is being removed from the container.

In the container according to the invention, the section of variable length is deformable between two definite end positions. As a result of a contact of a bearing surface upon the upper rim of the container opening, this section attains a definite compressed position, when the closure element is secured on the container. When the closure element is being loosened from the container, the section will return to its original position. The volume of the section, (and hence that of the total suction element), thereby increases as the sealing element is removed from the container, by a predetermined amount. The consequence of this increase in volume is that a predetermined quantity of fluid is aspirated into the suction tube of the dropper.

In order to secure the suction element of the dropper within the closure element in a simple manner, the connecting region may comprise an annular rib, which is in engagement with an annular groove of the closure element, so for assembly all that is required is that the suction element be pressed into the closure element to establish an engagement between the annular rib and the annular groove.

In order to attain a reliable sealing of a container, protrusions, distributed upon a base circle, can be provided in the closure element behind the bearing surface of the diameter of the base circle corresponds to the diameter of the upper rim of the container opening, the inwardly extending protrusions then will engage the bearing surface as the closure element closes the container; that is, the protrusions will press the lower surface of the annular bearing element against the upper rim, of the container opening.

If the container has a screw-type closure element, then the variable length section is twisted as the closure element closes the container; that is, when the closure element is screwed onto the container, this section will rotate about its longitudinal axis. As a result, the variable length section is capable of sealing off the suction element from the suction tube, thereby reducing the volume of air into which fluid can infiltrate, by evaporation.

The invention will be described in more detail below, with reference to the accompanying drawings, which show one exemplary embodiment.

DESCRIPTION OF THE PREFERRED EMBODIMENT

Figure 2:
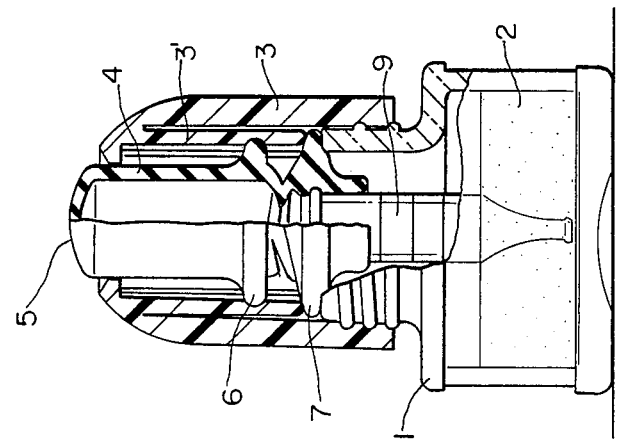
FIG. 2, partially in elevation and partially in section, shows the container of FIG. 1 with the closure element seated in a sealing manner.

The container 1 shown in the drawings is made of glass, and contains a fluid 2, such as writing ink. The container has a neck, provided with an outer thread, onto which closure element 3 can be screwed. The closure element 3 comprises a plastic cap having a longitudinally extending central opening, into which the dropper combination of a rubber suction element 4, and suction tube 9, may be inserted. An annular rib 6 on the suction element is adapted tightly to engage into an annular groove formed within the plastic cap 3. The posterior end 5 of the suction element protrudes to the outside, and beyond the posterior end of the closure element 3 and, therefore, is accessible from the outside. An intermediate section 8 of the rubber suction element 4, extends downwardly from the front of the annular rib 6 and terminates at an annular bearing element 7. Secured to the anterior end of the suction element is a conventional suction tube 9, which has a graduated scale 10.

If the sealing element 3 is screwed onto the outer thread of the container 1, then the lower surface of the annular bearing element 7 comes to rest upon the upper rim of the container opening, and the section 8 will be rotated or twisted, as shown in FIG. 2, due to frictional resistance between the lower bearing surface of element 7, and the upper rim of the container opening. In so doing, the annular rib 6 of the suction element 4 is approached by the annular bearing element 7. Consequently, *the volume of the section 8 is reduced.* Further, the anterior ends of ribs 3', which extend parallel to the longitudinal axis of the dropper and are part of the closure element 3, come to rest against the top surface of the annular bearing element 7 and press the element against the upper rim of the container opening, in order to attain a secure seal.

If the closure element 3 is screwed all the way onto the container (FIG. 2), fluid previously located in the suction tube 9 is express therefrom, due to the decrease in overall volume of the suction element 4, as it moves down upon the container 1. Furthermore, that interior volume of the suction element 4 located between the annular rib 6 and the posterior end 5 of the suction element 4 is sealed off from the suction tube 9 by the twisted section 8.

Figure 1:
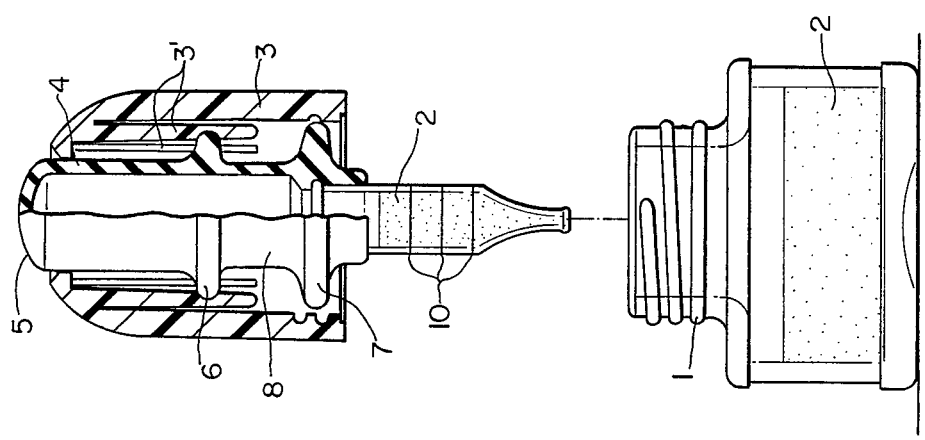
FIG. 1, partially in elevation and partially in section, shows a container having a closure element and dropper located above the container.

If the closure element 3 is unscrewed from the container, then the section 8 is allowed to resume its original volume. As a result of this, a definite increase in volume occurs, and a predetermined quantity of the fluid 2 is aspirated from the container 1 into the suction tube 9, so that the dropper is filled to the level shown in FIG. 1, after the closure element has been raised away from the container. Fluid can then be expressed out of the bottom of the suction tube 9 in a conventional manner, by pressing upon the posterior end 5 of the suction element 4.

Having described a preferred embodiment, it is understood that the invention is to be limited solely by the scope of the appended claims.

I claim:

1. In a container having a closure element further comprising an axially extending dropper, characterized by a suction element joined to the closure element and comprised of an elastically deformable material, accessible from outside of the closure element proximate its posterior region, and communicating to a suction tube at its anterior end, the improvement which comprises a sealing element means extending transversely from the suction element at an axial location that is anterior to a location where the suction element is joined to the closure element, and adapted to seal against the upper rim of said container opening, wherein said suction element further comprises a section adapted elastically to be deformed and shortened from its normal length in the axial direction thereby to define a volume decrease within said suction element, wherein further said deformable section (8) extends between said sealing means (7) and a connecting means (6) for said joining of the suction element to the closure element (3) and preventing axial motion therebetween, whereby, when the closure element (3) is axially moved into a sealing position upon the container (1), the axial length of said section is made shorter, and the suction element volume decreases in order to create a reproducible suction effect at the anterior end of the suction tube as the closure element (3) axially is removed out of contact with the container (1).

2. In a container according to claim 1, the further improvement in that the connection means further comprises a transversely extending annular rib (6) on the section element which engages into a transversely disposed annular groove formed within an interior surface of the closure element (3).

3. In a container according to claim 1, the further improvement in that said sealing means further comprises protrusions (3') which are distributed in a circle and extend axially from an inner surface of the closure element (3), in order to define anterior ends which normally are spaced above said sealing means (7), when the closure element is removed from the container wherein the diameter of said circle corresponds approximately to the diameter of the upper rim of the container opening, whereby the anterior ends of the protrusion (3'), are adapted to engage with and press against a posterior surface of the sealing means (7), when the closure element (3) axially closes upon the container (1).

4. In a container according to claim 2, the further improvement in that said sealing means further comprises protrusions (3') which are distributed in a circle and extend axially from an inner surface of the closure element (3), in order to define anterior ends which normally are spaced above said sealing means (7), when the closure element is removed from the container wherein the diameter of said circle corresponds approximately to the diameter of the upper rim of the container opening, whereby the anterior ends of the protrusion (3'), are adapted to engage with and press against a posterior surface of the sealing means (7), when the closure element (3) axially closes upon the container (1).

5. In a container according to claim 1, wherein said closure element engages an outer surface of said container through screw-type threads, characterized in that the section (8) is twisted to a reduced axial length, when the closure element (3) is screwed down upon the container (3).

6. In a container according to claim 2, wherein said closure element engages an outer surface of said container through screw-type threads, characterized in that the section (8) is twisted to a reduced axial length, when the closure element (3) is screwed down upon the container (3).

7. In a container according to claim 3, wherein said closure element engages an outer surface of said container through screw-type threads, characterized in that the section (8) is twisted to a reduced axial length, when the closure element (3) is screwed down upon the container (3).

* * * * *